United States Patent
Kim et al.

(10) Patent No.: US 10,752,751 B2
(45) Date of Patent: *Aug. 25, 2020

(54) PLASTICIZER COMPOSITION, RESIN COMPOSITION AND METHODS OF PREPARING THE SAME

(71) Applicant: LG CHEM, LTD., Seoul (KR)

(72) Inventors: Hyun Kyu Kim, Daejeon (KR); Mi Yeon Lee, Daejeon (KR); Yun Ki Cho, Daejeon (KR); Jeong Ju Moon, Daejeon (KR); Joo Ho Kim, Daejeon (KR); Seok Ho Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 113 days.

This patent is subject to a terminal disclaimer.

(21) Appl. No.: 15/767,626

(22) PCT Filed: Jun. 30, 2017

(86) PCT No.: PCT/KR2017/006997
§ 371 (c)(1),
(2) Date: Apr. 11, 2018

(87) PCT Pub. No.: WO2018/008913
PCT Pub. Date: Jan. 11, 2018

(65) Prior Publication Data
US 2018/0282512 A1  Oct. 4, 2018

(30) Foreign Application Priority Data

Jul. 5, 2016 (KR) .......... 10-2016-0084575

(51) Int. Cl.
| | | |
|---|---|---|
| C08K 5/12 | (2006.01) | |
| C08K 5/1515 | (2006.01) | |
| C08L 27/06 | (2006.01) | |
| C08L 23/06 | (2006.01) | |
| C08L 23/12 | (2006.01) | |
| C08L 25/06 | (2006.01) | |
| C08L 75/04 | (2006.01) | |
| C08K 5/00 | (2006.01) | |
| C08L 23/08 | (2006.01) | |

(52) U.S. Cl.
CPC .............. *C08K 5/12* (2013.01); *C08K 5/1515* (2013.01); *C08L 27/06* (2013.01); *C08K 5/0016* (2013.01); *C08L 23/06* (2013.01); *C08L 23/0853* (2013.01); *C08L 23/12* (2013.01); *C08L 25/06* (2013.01); *C08L 75/04* (2013.01); *C08L 2203/02* (2013.01); *C08L 2203/16* (2013.01); *C08L 2207/04* (2013.01)

(58) Field of Classification Search
USPC ................................. 524/109, 297
See application file for complete search history.

(56) References Cited

U.S. PATENT DOCUMENTS

| | | |
|---|---|---|
| 8,829,093 B2 | 9/2014 | Dakka et al. |
| 9,714,211 B2 | 7/2017 | Kim et al. |
| 10,150,727 B2 | 12/2018 | Kim et al. |
| 2014/0212666 A1 | 7/2014 | Dakka et al. |
| 2014/0213709 A1 | 7/2014 | Dakka et al. |
| 2014/0315021 A1 | 10/2014 | Naert et al. |
| 2015/0080545 A1 | 3/2015 | Dakka et al. |
| 2015/0080546 A1 | 3/2015 | Dakka et al. |
| 2015/0140350 A1 | 5/2015 | Dakka et al. |
| 2016/0159051 A1 | 6/2016 | Lu et al. |
| 2016/0160005 A1 | 6/2016 | Lu et al. |
| 2016/0160030 A1 | 6/2016 | Chen et al. |
| 2016/0237022 A1 | 8/2016 | Dakka et al. |
| 2016/0272780 A1 | 9/2016 | Kim et al. |
| 2016/0376219 A1 | 12/2016 | Kim et al. |
| 2017/0166724 A1 | 6/2017 | Kim et al. |
| 2019/0211182 A1* | 7/2019 | Kim ............... C07C 69/80 |

FOREIGN PATENT DOCUMENTS

| | | | | |
|---|---|---|---|---|
| CN | 105102418 A | | 11/2015 | |
| EP | 2927210 A1 | | 10/2015 | |
| JP | 10-29870 A | | 2/1998 | |
| JP | 2016033179 A | * | 3/2016 | ............ C09J 127/06 |
| KR | 10-0812511 B1 | | 3/2008 | |
| KR | 10-2015-0100911 A | | 9/2015 | |
| WO | 2015/119355 A1 | | 8/2015 | |

OTHER PUBLICATIONS

Machine translation of Description of JP 2016-33179 A retrieved from ESPACENET; publication date: Mar. 10, 2016. (Year: 2016).*
Search Report of European Patent Office in Appl'n No. 17824469.5, dated Nov. 7, 2018.

* cited by examiner

*Primary Examiner* — Fred M Teskin
(74) *Attorney, Agent, or Firm* — Dentons US LLP

(57) ABSTRACT

The present invention relates to a plasticizer composition, a resin composition and a method of preparing the same, particularly, provides an environmentally-friendly plasticizer composition, which is suitable for use as an application to resins for food packaging, has excellent transparency, color and pressure-sensitive adhesion, and is capable of maintaining/improving mechanical properties such as tensile strength, an elongation rate and hardness when used as a plasticizer of the resin composition, and a resin composition including the same.

14 Claims, No Drawings

PLASTICIZER COMPOSITION, RESIN COMPOSITION AND METHODS OF PREPARING THE SAME

CROSS REFERENCE

This application is a National Stage Application of International Application No. PCT/KR2017/006997 filed Jun. 30, 2017, and claims the benefit of Korean Patent Application No. 10-2016-0084575 filed Jul. 5, 2016, all of which are hereby incorporated by reference in their entirety for all purposes as if fully set forth herein.

TECHNICAL FIELD

The present invention relates to a plasticizer composition, a resin composition comprising the same and methods of preparing the same.

BACKGROUND ART

Conventionally, a plasticizer forms an ester through a reaction between an alcohol and a polycarboxylic acid such as phthalic acid or adipic acid. In addition, in consideration of domestic and international regulations for phthalate-based plasticizers harmful to humans, there is ongoing research on plasticizer compositions that can replace phthalate-based plasticizers such as terephthalate-, adipate-, and other polymer-based plasticizers.

Meanwhile, in consideration of discoloration, it is necessary to use suitable plasticizers to manufacture products relating to flooring materials, wallpaper or sheets requiring light fastness as a physical property. For PVC compounds for wall paper or sheets, depending on properties required for corresponding specifications, such as tensile strength, an elongation rate, light fastness, a bleeding phenomenon, gelability, etc., a PVC resin is mixed with a plasticizer, a filler, a stabilizer, a viscosity depressant, a dispersant, an antifoaming agent or a foaming agent.

For example, when cheap dioctyl terephthalate among PVC-applicable plasticizer compositions was used, due to high viscosity and a relatively low absorption rate of a plasticizer, a bleeding phenomenon of the plasticizer transuding the back side of stencil paper was observed, and gelability was not good enough. Therefore, as a product which is better than the dioctyl terephthalate, or a product of a new composition comprising dioctyl terephthalate has been developed, research on the technology that can be optimally applied as a plasticizer for a vinyl chloride-based resin is still needed.

DISCLOSURE

Technical Problem

Therefore, which conducting research on plasticizers, the inventors identified a plasticizer composition capable of improving poor physical properties caused by structural restraints, and thus the present invention was completed.

That is, the present invention is directed to providing a plasticizer capable of improving physical properties such as light fastness required for a compound formulation, or viscosity, a bleeding phenomenon, gelability, etc., required for a sheet formulation when used as a plasticizer for a resin composition, a method of preparing the same, and a resin composition comprising the same.

Technical Solution

In one aspect, the present invention provides a plasticizer composition, which comprises an ester-based material comprising an isophthalate-based material including a compound represented by Formula 1 and a terephthalate-based material including a compound represented by Formula 2; and epoxidized oil, and a weight ratio of the isophthalate-based material with respect to the terephthalate-based material is 99:1 to 1:99.

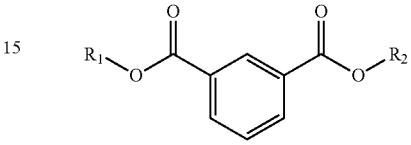

[Formula 1]

In Formula 1, $R_1$ and $R_2$ are the same or different, and each independently a C1 to C12 alkyl group.

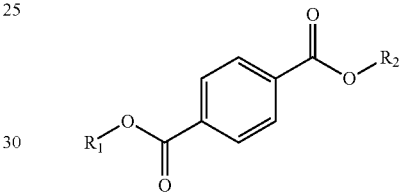

[Formula 2]

In Formula 2, $R_1$ and $R_2$ are the same or different, and each independently a C1 to C12 alkyl group.

$R_1$ of Formula 1 and $R_1$ of Formula 2 are the same, and $R_2$ of Formula 1 and $R_2$ of Formula 2 may be the same.

In Formulas 1 and 2, $R_1$ and $R_2$ are each independently a C4 to C10 alkyl group.

The isophthalate-based material is a mixed material comprising two or more compounds represented by Formula 1, and the mixed material may comprise one or more compounds represented by Formula 1 in which $R_1$ and $R_2$ are different from each other.

The terephthalate-based material is a mixed material comprising two or more compounds represented by Formula 2, and the mixed material may comprise one or more compounds represented by Formula 2 in which $R_1$ and $R_2$ are different from each other.

The weight ratio of the isophthalate-based material to the terephthalate-based material may be 95:5 to 30:70.

The weight ratio of the isophthalate-based material to the terephthalate-based material may be 90:10 to 40:60.

The epoxidized oil may be contained at a content of 1 to 100 parts by weight with respect to 100 parts by weight of the ester-based material.

The epoxidized oil may include one or more oils selected from the group consisting of epoxidized soybean oil, epoxidized castor oil, epoxidized linseed oil, epoxidized palm oil, epoxidized stearate, epoxidized oleate, epoxidized tall oil and epoxidized linoleate.

In another aspect, the present invention provides a method of preparing a plasticizer composition, which comprises: preparing an ester-based material by mixing an isophthalate-based material with a terephthalate-based material at a weight ratio of 99:1 to 1:99; and adding epoxidized oil to the ester-based material to obtain a plasticizer composition.

The preparation of the ester-based material may include mixing products obtained by direct esterification between a mixture of isophthalic acid, terephthalic acid and a C2 to C12 alkyl alcohol; or direct esterification between a C2 to C12 alkyl alcohol and either of isophthalic acid and terephthalic acid.

When the isophthalate-based material or terephthalate-based material is a mixed material including two or more materials, the mixed material may be prepared by trans-esterification between the isophthalate-based material represented by Formula 1 or the terephthalate-based material represented by Formula 2 and a C2 to C12 alkyl alcohol.

[Formula 1]

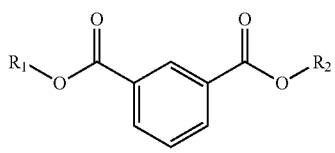

In Formula 1, $R_1$ and $R_2$ are the same or different, and each independently a C1 to C12 alkyl group.

[Formula 2]

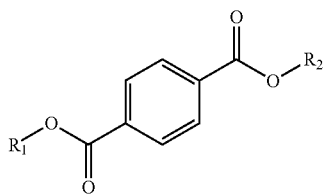

In Formula 2, $R_1$ and $R_2$ are the same or different, and each independently a C1 to C12 alkyl group.

In still another aspect, the present invention provides a resin composition, which comprises 100 parts by weight of a resin; and 5 to 150 parts by weight of the above-described plasticizer composition.

The resin may include one or more selected from the group consisting of ethylene vinyl acetate, polyethylene, polypropylene, polyketone, polyvinyl chloride, polystyrene, polyurethane, and a thermoplastic elastomer.

The resin composition may be applied to manufacture one or more selected from the group consisting of wires, flooring materials, interior materials for automobiles, films, sheets, wallpaper and tubes.

Advantageous Effects

A plasticizer composition according to an exemplary embodiment of the present invention can improve physical properties such as plasticization efficiency, tensile strength and an elongation rate, and provide excellent physical properties such as migration loss and volatile loss, when used in a resin composition.

Modes of the Invention

EXAMPLES

Hereinafter, to explain the present invention in detail, the present invention will be described in detail with reference to examples. However, examples according to the present invention may be modified in a variety of different forms, and the scope of the present invention should not be construed as being limited to the examples to be described below. The exemplary embodiments of the present invention are provided for those of ordinary skill in the art to more fully understand the present invention.

Preparation Example 1: Preparation of di(2-ethylhexyl)terephthalate (DEHIP)

498.0 g of purified isophthalic acid (PIA), 1,170 g of 2-ethylhexyl alcohol (2-EHA; the molar ratio of PIA:2-EHA:1.0:3.0), and 1.54 g of a titanium-based catalyst (tetra isopropyl titanate (TIPT); 0.31 parts by weight with respect to 100 parts by weight of PIA) were added to a 3 L 4-neck reaction vessel equipped with a cooler, a water stripper, a condenser, a decanter, a reflux pump, a temperature controller, an agitator, etc., and a temperature was slowly increased to approximately 170° C. At approximately 170° C., water was generated, and esterification was performed for approximately 4.5 hours while a nitrogen gas was continuously added at a reaction temperature of approximately 220° C. under atmospheric pressure, and then terminated when an acid value reached 0.01.

After the reaction was completed, distillation extraction was performed for 0.5 to 4 hours under reduced pressure to remove unreacted components. To remove unreacted components at a predetermined content or less, steam extraction was performed using steam for 0.5 to 3 hours under reduced pressure, and neutralization was performed using an alkali solution after a reaction solution was cooled to approximately 90° C. Additionally, washing could be performed, and then the reaction solution was dehydrated to remove moisture. Filter media were input into the dehydrated reaction solution, stirred for a predetermined time and then filtered, thereby finally obtaining 1243.3 g of DEHIP (yield: 99.0%).

Preparation Example 2: Preparation of Diisononyl Isophthalate (DINIP)

498.0 g of purified PIA, 1,298.3 g of isononyl alcohol (INA) (molar ratio of PIA:INA:1.0:3.0), and 1.54 g of a titanium-based catalyst (TIPT; 0.31 parts by weight with respect to 100 parts by weight of PIA) were added to a 3 L 4-neck reaction vessel equipped with a cooler, a water stripper, a condenser, a decanter, a reflux pump, a temperature controller, an agitator, etc., and a temperature was slowly increased to approximately 170° C. At approximately 170° C., water was generated, and esterification was performed for approximately 4.5 hours while a nitrogen gas was continuously added at a reaction temperature of approximately 220° C. under atmospheric pressure, and then terminated when an acid value reached 0.01.

After the reaction was completed, distillation extraction was performed for 0.5 to 4 hours under reduced pressure to remove unreacted components. To remove unreacted components at a predetermined content or less, steam extraction was performed using steam for 0.5 to 3 hours under reduced pressure, and neutralization was performed using an alkali solution after a reaction solution was cooled to approximately 90° C. Additionally, washing could be performed, and then the reaction solution was dehydrated to remove moisture. Filter media were input into the dehydrated reaction solution, stirred for a predetermined time and then filtered, thereby finally obtaining 1243.3 g of DINIP (yield: 99.0%).

Preparation Example 3: Preparation of
di(2-ethylhexyl) Terephthalate (DEHTP)

DEHTP was obtained by the same method as described in Preparation Example 1, except that terephthalic acid was used instead of isophthalic acid in esterification.

Preparation Example 4: Preparation of DINTP

DINTP was obtained by the same method as described in Preparation Example 2, except that terephthalic acid was used instead of isophthalic acid in esterification.

Examples and Comparative examples were configured as shown in Tables 1 to 4.

TABLE 1

|  | First composition + Second composition | Epoxidized oil (parts by weight) |
|---|---|---|
| Example 1-1 | DEHIP + DINTP (6.25:3.75) | ESO (25) |
| Example 1-2 | DEHIP + DINTP (5.7:4.3) | ESO (43) |

TABLE 2

|  | First composition | Second composition |
|---|---|---|
| Comparative Example 1-1 | DINP | — |
| Comparative Example 1-2 | DEHIP | — |
| Comparative Example 1-3 | DEHIP + DINTP(7:3) | — |
| Comparative Example 1-4 | DEHIP + DINTP(3:7) | — |

TABLE 3

|  | First composition + Second composition | Epoxidized oil (parts by weight) |
|---|---|---|
| Example 2-1 | DINIP + DINTP (6.25:3.75) | ESO (25) |
| Example 2-2 | DINIP + DINTP (5.7:4.3) | ESO (43) |
| Example 2-3 | DINIP + DINTP (4.3:5.7) | ESO (43) |

TABLE 4

|  | First composition | Second composition |
|---|---|---|
| Comparative Example 2-1 | DIDP | — |
| Comparative Example 2-2 | DINIP | — |
| Comparative Example 2-3 | DINIP + DINTP (7:3) | — |
| Comparative Example 2-4 | DINIP + DINTP (3:7) | — |

Evaluation of performance of plasticizers according to the examples and the comparative examples was carried out on the basis of the following test items.

<Test Items>

Measurement of Hardness

According to ASTM D2240, Shore hardness (Shore "A" or "D") was measured using a 3 T sheet for 10 seconds at 25° C.

Measurement of Tensile Strength

According to ASTM D638, each specimen was pulled at a cross head speed of 200 mm/min (1 T) using a tester, U.T.M, (Manufacturer; Instron, Model No.; 4466), and a position at which the specimen was broken was detected. Tensile strength was calculated as follows:

Tensile strength (kgf/cm$^2$)=Load value (kgf)/Thickness (cm)×Width (cm)

Measurement of Elongation Rate

According to ASTM D638, each specimen was pulled at a cross head speed of 200 mm/min (1T) using the U.T.M, and a position at which the specimen was broken was detected. An elongation rate was calculated as follows:

Elongation rate (%)=Length after elongation/Initial length×100

Measurement of Tensile Strength and Elongation Retentions

Measurement of tensile strength and elongation retentions was carried out by applying heat to specimens at 100° C. for 168 hours, and measuring tensile strength and an elongation rate remaining in the specimens, and measurement methods are the same as those for tensile strength and an elongation rate.

Measurement of Migration Loss

An experimental specimen having a thickness of 2 mm or more was obtained according to KSM-3156, and PS plates were attached to both sides of the specimen, followed by applying a load of 1 kgf/cm$^2$. The specimen was maintained in a forced convection oven (80° C.) for 72 hours, and cooled to room temperature for 4 hours. Afterward, following removal of the PS plates attached to both sides of the specimen, the weights of the specimen before and after the maintenance in the oven were measured to calculate a migration loss by the equation below.

Migration loss (%)=[(Initial weight of specimen at room temperature−Weight of specimen after maintained in oven)/Initial weight of specimen at room temperature]×100

Measurement of Volatile Loss

The prepared specimen was processed at 100° C. for 168 hours, and a weight of the specimen was measured:

Volatile loss (wt %)=[(Initial weight of specimen−Weight of specimen after processed at 100° C. for 168 hours)/Initial weight of specimen]×100

Measurement of Cold Resistance

Temperatures at which three of five specimens previously manufactured were broken by an impact after they had been maintained at a specific temperature for 3 minutes.

Experimental Example 1: Evaluation of Performance of DEHIP-Based Plasticizer Composition Experimental specimens were manufactured using plasticizer compositions of Examples 1-1 to 1-2 and Comparative Examples 1-1 to 1-7 by the following method with reference to ASTM D638.

40 parts by weight of each of the plasticizer compositions prepared in the examples and the comparative examples, 5 parts by weight of RUP 144 (Adeka Korea Co., Ltd.) as a stabilizer, and 30 parts by weight of OMYA 1 T (OMYA Inc.) as a filler were blended with respect to 100 parts by weight of a poly(vinyl chloride) resin (PVC (LS100)), and mixed using a mixer at 700 rpm and 98° C. Specimens (1 T, 2 T and 3 T sheets) were manufactured by processing the mixed material using a roll mill at 160° C. for 4 minutes, and using a press at 180° C. for 2.5 minutes (low pressure) and 2 minutes (high pressure).

Evaluations were carried out for the specimens on the basis of the above-described items, and performance evaluation results for each specimen are shown in Table 5.

TABLE 5

|  | Hardness (Shore "D") | Tensile strength (kg/cm$^2$) | Tensile strength retention (%) | Elongation rate (%) | Elongation retention (%) | Migration loss (%) | Volatile loss (%) | Cold resistance (° C.) |
|---|---|---|---|---|---|---|---|---|
| Example 1-1 | 52.8 | 211.0 | 105.4 | 291.8 | 96.5 | 1.11 | 0.96 | −22 |
| Example 1-2 | 52.4 | 216.5 | 101.1 | 288.8 | 96.2 | 0.84 | 0.90 | −21 |
| Comparative Example 1-1 | 52.0 | 188.0 | 95.3 | 277.0 | 91.3 | 1.92 | 1.85 | −23 |
| Comparative Example 1-2 | 52.1 | 208.9 | 97.3 | 282.7 | 93.4 | 2.03 | 3.44 | −23 |
| Comparative Example 1-3 | 55.5 | 219.4 | 102.0 | 292.2 | 94.0 | 2.09 | 1.43 | −21.5 |
| Comparative Example 1-4 | 54.1 | 224.7 | 97.0 | 290.3 | 95.0 | 1.22 | 2.08 | −22 |

<Details on Conditions for Evaluation>

*Hardness: 3T/10 s

*Tensile strength and elongation rate: 1T/200 mm/min

*Tensile strength retention and elongation retention: 100° C./168 hr

*Migration loss: 1 T/80° C./2 kgf load/72 hr

*Volatile loss: 1 T/100° C./168 hr

*Cold resistance: 2 T/3 min

As shown in Table 5, compared to the specimen of Comparative Example 1-1 using a DINP plasticizer and the specimen of Comparative Example 1-2 using a DEHIP plasticizer, which are conventional products that are widely sold commercially, it can be confirmed that the specimens of Example 1-1 to 1-2 have the same or better physical properties. In other words, when the plasticizer composition of the present invention prepared by mixing DEHIP with DINTP or DEHTP is used to produce a resin, it can be identified that it is possible to replace DINP, which has an environmental issue, and provide a resin exhibiting better physical properties.

In addition, compared to Comparative Examples 1-3 and 1-4 in which only an ester-based composition is added to the plasticizer composition of the present invention, it can be confirmed that the specimens of the examples exhibit better volatile loss and migration. Therefore, it can be confirmed that a mixed material of epoxidized oil and the ester-based composition used as a plasticizer composition, when applied to a resin composition, exhibits an effect of improving physical properties, and also ensures the same or higher mechanical properties than those of the conventional plasticizers, which are commercially available.

Experimental Example 2: Evaluation of Performance of DINIP-Based Plasticizer Composition Experimental specimens were manufactured using plasticizer compositions of Examples 2-1 to 2-3 and Comparative Examples 2-1 to 2-4 by the following method with reference to ASTM D638.

50 parts by weight of each of the plasticizer compositions prepared in the examples and comparative examples, 5 parts by weight of RUP 144 (Adeka Korea Co., Ltd.) as a stabilizer, 40 parts by weight of OMYA 1 T (OMYA Inc.) as a filler and 0.3 parts by weight of St-acid as a lubricant were blended with respect to 100 parts by weight of a poly(vinyl chloride) resin (PVC(LS100)), and mixed using a mixer at 700 rpm and 98° C. Specimens (1 T, 2 T and 3 T sheets) were manufactured by processing the mixed material using a roll mill at 160° C. for 4 minutes, and using a press at 180° C. for 2.5 minutes (low pressure) and 2 minutes (high pressure).

Evaluations were carried out on the specimens on the basis of the above-described items, and performance evaluation results for each specimen are shown in Table 6.

TABLE 6

|  | Hardness (Shore "A") | Tensile strength (kg/cm$^2$) | Tensile strength retention (%) | Elongation rate (%) | Elongation retention (%) | Volatile loss (%) | Cold resistance (° C.) |
|---|---|---|---|---|---|---|---|
| Example 2-1 | 81.7 | 194.1 | 99.5 | 333.1 | 95.2 | 0.82 | −26.5 |
| Example 2-2 | 81.7 | 191.7 | 100.5 | 322.1 | 99.6 | 0.66 | −26 |
| Example 2-3 | 81.6 | 188.0 | 101.9 | 321.6 | 98.7 | 0.77 | −25 |
| Comparative Example 2-1 | 82.5 | 184.1 | 96.1 | 310.0 | 85.9 | 4.01 | −24.5 |
| Comparative Example 2-2 | 82.3 | 188.7 | 97.7 | 317.9 | 90.7 | 2.77 | −27 |
| Comparative Example 2-3 | 82.2 | 190.0 | 97.7 | 316.8 | 96.4 | 1.41 | −32 |
| Comparative Example2-4 | 81.8 | 191.0 | 99.2 | 324.4 | 92.5 | 2.16 | −30 |

<Details on Conditions for Evaluation>

*Hardness: 3 T/10 s

*Tensile strength and elongation rate: 1 T/200 mm/min

*Tensile strength retention and elongation retention: 121° C./168 hr

*Migration loss: 1 T/80° C./2 kgf load/72 hr

*Volatile loss: 1 T/121° C./168 hr

*Cold resistance: 2 T/3 min

As shown in Table 6, compared to the specimen of Comparative Example 2-1 using a DINP plasticizer and the specimen of Comparative Example 2-2 using a DINIP plasticizer, which are conventional products that are widely sold commercially, it can be confirmed that the specimens of Example 2-1 to 2-3 have the same or better physical properties. In other words, when the plasticizer composition of the present invention prepared by mixing DINIP with DINTP or DEHTP is used to produce a resin, it can be identified that it is possible to replace DIDP, which has an environmental issue, and provide a resin exhibiting better physical properties.

In addition, compared to Comparative Examples 2-3 and 2-4 in which only an ester-based composition is added to the plasticizer composition of the present invention, it can be confirmed that the specimens of the examples exhibit remarkably excellent volatile loss. Therefore, it can be confirmed that a mixed material of epoxidized oil and the ester-based composition used as a plasticizer composition, when applied to a resin composition, exhibits an effect of improving physical properties, and also ensures the same or higher mechanical properties than those of the conventional plasticizers, which are commercially available.

Hereinafter, the present invention will be described in detail.

First, the present invention has a technical feature for providing a plasticizer composition which can improve poor physical properties caused by its structural restraints.

According to an exemplary embodiment of the present invention, a plasticizer composition comprising an ester-based material prepared by mixing an isophthalate-based material with a terephthalate-based material may be provided. Specifically, the ester-based material includes an isophthalate-based material, and a plasticizer composition comprising the isophthalate-based material at 1 to 99 wt %, 1 to 95 wt %, 10 to 90 wt %, or 30 to 70 wt % based on the total weight of the ester-based material may be provided.

The isophthalate-based material may include a compound represented by Formula 1 below, and may be a mixed material comprising two or more of the compounds represented by Formula 1 below.

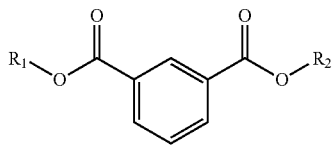

[Formula 1]

In Formula 1, $R_1$ and $R_2$ are the same or different, and each independently a C1 to C12 alkyl group.

In addition, the ester-based material includes a terephthalate-based material, and the terephthalate-based material may include a compound represented by Formula 2 below, and a mixed material comprising two or more of the compounds represented by Formula 1.

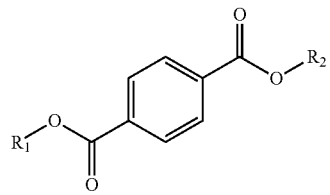

[Formula 2]

In Formula 2, $R_1$ and $R_2$ are the same or different, and each independently a C1 to C12 alkyl group.

Each of the isophthalate-based material and the terephthalate-based material included in the ester-based material may have different or the same substituents at both ends. Preferably, each of the isophthalate-based material and the terephthalate-based material may have the same substituents at both ends. That is, $R_1$ of Formula 1 and $R_1$ of Formula 2 may be the same, and $R_2$ of Formula 1 and $R_2$ of Formula 2 may be the same.

In Formulas 1 and 2, each of $R_1$ and $R_2$ is independently selected from a C1 to C12 alkyl group, a C3 to C11 alkyl group, and a C4 to C10 alkyl group.

Preferably, $R_1$ and $R_2$ are selected from the group consisting of a butyl group, an isobutyl group, a 2-ethylhexyl group and an isononyl group, and when the ester-based material having such substituents is applied to a plasticizer, a plasticizer composition improved in gelability and plasticization efficiency may be provided.

In the ester-based material, a mixed weight ratio of the isophthalate-based material and the terephthalate-based material may be 99:1 to 1:99, 95:5 to 10:90, 95:5 to 30:70, 90:10 to 30:70, or 90:10 to 40:60. Depending on the use as a plasticizer, the isophthalate-based material may be contained at an excessively larger content than the terephthalate-based material, but the present invention is not limited thereto.

Likewise, a resin prepared of an ester-based material in which an isophthalate-based material and a terephthalate-based material are mixed together as a plasticizer composition may have more excellent physical properties such as tensile strength and an elongation rate than the resin prepared of a plasticizer composition only comprising the isophthalate-based material.

The isophthalate-based material including the compound represented by Formula 1 may be a single compound, or a mixed material in which two or more compounds are mixed. When the isophthalate-based material is a single compound, a compound having the same $R_1$ and $R_2$ may be selected, and may be, for example, a single compound selected from the group consisting of di(2-ethylhexyl)isophthalate (DEHIP), diisononyl isophthalate (DINIP), dibutyl isophthalate (DBIP), butylisononyl isophthalate (BINTP), butyl(2-ethylhexyl) isophthalate (BEHIP) and (2-ethylhexyl)isononyl isophthalate (EHINIP), or a mixed material in which one or more compounds are mixed.

Preferably, when the isophthalate-based material is a single compound, di(2-ethylhexyl)isophthalate or diisononyl isophthalate may be selected.

When the isophthalate-based material comprises two or more of the compounds represented by Formula 1, one or more compounds represented by Formula 1 in which $R_1$ and $R_2$ are different may be contained. For example, the isophthalate-based material may be a mixed material of three types of isophthalate-based materials, for example, a first mixture in which di(2-ethylhexyl)isophthalate, butyl(2- ethylhexyl)isophthalate and dibutyl isophthalate are mixed, a second mixture in which diisononyl isophthalate, butylisononyl isophthalate and dibutyl isophthalate are mixed, and a third mixture in which di(2-ethylhexyl)isophthalate, (2-ethylhexyl)isononyl isophthalate and diisononyl isophthalate are mixed.

Specifically, the first to third mixtures may have specific composition ratios, and the first mixture may comprise 3.0 to 99.0 mol % of di(2-ethylhexyl)isophthalate; 0.5 to 96.5 mol % of butyl(2-ethylhexyl)isophthalate; and 0.5 to 96.5 mol % of dibutyl isophthalate, the second mixture may comprise 3.0 to 99.0 mol % of diisononyl isophthalate; 0.5 to 96.5 mol % of butylisononyl isophthalate; and 0.5 to 96.5 mol % of dibutyl isophthalate, and the third mixture may comprise 3.0 to 99.0 mol % of di(2-ethylhexyl)isophthalate; 0.5 to 96.5 mol % of (2-ethylhexyl)isononyl isophthalate; and 0.5 to 96.5 mol % of diisononyl isophthalate.

The composition ratio may be a ratio of a mixed composition produced by esterification or an intended ratio of a composition to which a specific compound is further added, and the mixed composition ratio may be properly adjusted to suit desired physical properties.

In addition, the terephthalate-based material including a compound represented by Formula 2 may be a single compound, or a mixed material in which two or more compounds are mixed. When the terephthalate-based material is a single compound, a compound in which $R_1$ and $R_2$ are the same may be selected, and may be, for example, a single compound selected from the group consisting of di(2-ethylhexyl) terephthalate (DEHTP), diisononyl terephthalate (DINTP), dibutyl terephthalate (DBTP), butylisononyl terephthalate (BINTP), butyl(2-ethylhexyl) terephthalate (BEHTP or BOTP) and (2-ethylhexyl)isononyl terephthalate (EHINTP or OINTP), or a mixed material in which one or more compounds are mixed.

More specifically, when the terephthalate-based material is a single compound, it may be di(2-ethylhexyl)terephthalate or diisononylterephthalate, and when the terephthalate-based material is a mixture, it may be a mixture of three types of terephthalate-based materials, for example, a first mixture in which di(2-ethylhexyl)terephthalate, butyl(2-ethylhexyl)terephthalate and dibutylterephthalate are mixed, a second mixture in which diisononylterephthalate, butylisononylterephthalate and dibutylterephthalate are mixed, and a third mixture in which di(2-ethylhexyl)terephthalate, (2-ethylhexyl)isononylterephthalate and diisononylterephthalate are mixed.

Specifically, the first to third mixtures may have specific composition ratios, and the first mixture may comprise 3.0 to 99.0 mol % of di(2-ethylhexyl)terephthalate; 0.5 to 96.5 mol % of butyl(2-ethylhexyl)terephthalate; and 0.5 to 96.5 mol % of dibutylterephthalate, the second mixture may comprise 3.0 to 99.0 mol % of diisononylterephthalate; 0.5 to 96.5 mol % of butylisononylterephthalate; and 0.5 to 96.5 mol % of dibutylterephthalate, and the third mixture may comprise 3.0 to 99.0 mol % of di(2-ethylhexyl)terephthalate; 0.5 to 96.5 mol % of (2-ethylhexyl)isononylterephthalate; and 0.5 to 96.5 mol % of diisononylterephthalate.

The composition ratio may be a ratio of a mixed composition produced by esterification or an intended ratio of a composition to which a specific compound is further added, and the mixed composition ratio may be properly adjusted to suit desired physical properties.

The plasticizer composition comprises an ester-based material, and further comprises epoxidized oil.

The plasticizer composition comprising an ester-based material may not have relatively excellent thermal resistance among various physical properties, and such thermal resistance can be compensated for by further comprising the epoxidized oil.

An amount of the epoxidized oil added to compensate for the thermal resistance may be 1 to 130 parts by weight, and preferably, 10 to 100 parts by weight or 20 to 100 parts by weight with respect to 100 parts by weight of the ester-based material. When the epoxidized oil is added in the above range, the thermal resistance may be compensated for, but when an excessive amount of the epoxidized oil is added such that the amount exceeds 100 parts by weight, basic physical properties of the plasticizer are likely to be degraded because a cyclohexanedicarboxylate-based material and a citrate-based material are relatively less contained, thus it is necessary to adjust their contents. In addition, while the epoxidized oil is contained at 1 part by weight or more, if possible, 10 parts by weight or more of the epoxidized oil is preferably contained, and when less than 10 parts by weight of the epoxidized oil may be contained, it is likely to adversely affect the physical properties of the plasticizer.

The epoxidized oil may be, for example, epoxidized soybean oil, epoxidized castor oil, epoxidized linseed oil, epoxidized palm oil, epoxidized stearate, epoxidized oleate, epoxidized tall oil, epoxidized linoleate or a mixture thereof. Preferably, the epoxidized oil is epoxidized soybean oil (ESO) or epoxidized linseed oil (ELO), but the present invention is not limited thereto.

As a method of preparing the plasticizer composition of the present invention, a blending method may be applied, and an example of the blending method will be described as follows:

The plasticizer composition may be prepared by a method comprising: preparing an ester-based material by mixing an isophthalate-based material with a terephthalate-based material at a weight ratio of 99:1 to 1:99; and adding epoxidized oil to the ester-based material.

The preparation of the ester-based material may be performed by a method using direct esterification as follows. In this case, each of the isophthalate-based material and the terephthalate-based material contained in the ester-based material may be a single compound, and in each of the compounds represented by Formulas 1 and 2, $R_1$ and $R_2$ may be the same or different.

That is, after direct esterification is carried out using isophthalic acid and a C1 to C12 alkyl alcohol as reactants, and after direct esterification is carried out using terephthalic acid and a C1 to C12 alkyl alcohol as reactants, the products of the reactions may be mixed, thereby preparing an ester-based material.

In addition, in Formulas 1 and 2, when $R_1$ is the same as each other and $R_2$ is the same as each other, an ester-based material may be prepared by direct esterification between a mixture of isophthalic acid and terephthalic acid and a C1 to C12 alkyl alcohol.

When $R_1$ and $R_2$ are the same in the compounds represented by Formulas 1 and 2, only one type of the C1 to C12 alkyl alcohol may participate in the reaction, and when $R_1$ and $R_2$ are different, two types of the alcohols are added to participate in the reaction.

The direct esterification for preparing an ester-based material may include adding isophthalic acid and/or terephthalic acid to an alcohol and then a catalyst thereto to allow a reaction under a nitrogen atmosphere; removing an unreacted alcohol and neutralizing an unreacted acid; and performing dehydration and filtration by vacuum distillation.

In addition, the alcohol may be used in a range of 150 to 500 mol %, 200 to 400 mol %, 200 to 350 mol %, 250 to 400 mol %, or 270 to 330 mol % on the basis of 100 mol % of isophthalic acid and/or terephthalic acid.

However, the catalyst used in the direct esterification may be any catalyst capable of being used in esterification without particular limitation, and for example, one or more selected from acidic catalysts such as sulfuric acid, hydrochloric acid, phosphoric acid, nitric acid, para-toluenesulfonic acid, methanesulfonic acid, ethanesulfonic acid, propanesulfonic acid, butanesulfonic acid, and an alkyl sulfate, metal salts such as aluminum sulfate, lithium fluoride, potassium chloride, cesium chloride, calcium chloride, iron chloride and aluminum phosphate, metal oxides such as a heteropoly acid, natural/synthetic zeolites, cation and anion exchange resins, and organic metals such as a tetra alkyl titanate and a polymer thereof. Preferably, the catalyst is a tetra alkyl titanate.

An amount of the catalyst used herein may vary according to its type, and as an example, a homogeneous catalyst may be used in a range of 0.01 to 5 wt %, 0.01 to 3 wt %, 1 to 5 wt % or 2 to 4 wt % with respect to 100 wt % of the total reactants, and a heterogeneous catalyst may be used in a range of 5 to 200 wt %, 5 to 100 wt %, 20 to 200 wt %, or 20 to 150 wt % with respect to the total weight of the reactants.

Here, the reaction temperature may be in a range of 180 to 280, 200 to 250, or 210 to 230° C.

In addition, the preparation of an ester-based material may be performed using trans-esterification. In this case, the isophthalate-based material and/or terephthalate-based material contained in the ester-based material may be a mixed material comprising two or more types of compounds, or may contain one or more types of compounds represented by Formulas 1 and 2, each of which has $R_1$ and $R_2$ different from each other.

The term "trans-esterification" used herein refers to a reaction between an alcohol and an ester in which R″ of an ester is interchanged with R' of an alcohol as shown in Reaction Scheme 1:

[Reaction Scheme 1]

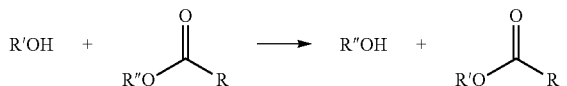

According to an exemplary embodiment of the present invention, the trans-esterification may produce three types of ester compositions according to three cases in which an alkoxide of the alcohol attacks carbons of two ester (RCOOR″) groups present in an ester-based compound; an alkoxide of the alcohol attacks carbons of one ester (RCOOR″) group present in an ester-based compound; and there is no reaction between an alcohol and an ester group in an ester-based compound.

In addition, compared to an acid-alcohol esterification, the trans-esterification does not cause water pollution, and may solve problems caused by the use of an acidic catalyst because of proceeding without a catalyst.

Hereinabove, a terephthalate-based material was exemplified, and specifically, di(2-ethylhexyl)terephthalate was used as an example. It may be applied in the same manner to prepare an isophthalate-based material.

For example, di(2-ethylhexyl)terephthalate and butyl alcohol may be used in the trans-esterification, thereby producing a mixture of di(2-ethylhexyl)terephthalate, butyl (2-ethylhexyl)terephthalate and dibutylterephthalate, and each of the three types of terephthalates may be formed at an amount of 3.0 wt % to 70 wt %, 0.5 wt % to 50 wt %, or 0.5 wt % to 85 wt %, specifically 10 wt % to 50 wt %, 0.5 wt % to 50 wt %, or 35 wt % to 80 wt % with respect to total weight of the mixture of the three types of terephthalates. In this range, a terephthalate-based material (mixture) having high process efficiency, and excellent processability and an excellent absorption rate is obtained.

In addition, a composition ratio of the mixture prepared by the trans-esterification may be controlled according to the amount of an alcohol used herein.

The amount of an alcohol used herein may be 0.1 to 89.9 parts by weight, specifically, 3 to 50 parts by weight, and more specifically, 5 to 40 parts by weight with respect to 100 parts by weight of the terephthalate.

As the amount of an alcohol increases, a mole fraction of the terephthalate participating in the trans-esterification may be higher, contents of the two terephthalates, which are products, in the mixture may increase, and accordingly, contents of the terephthalates present in an unreacted state are likely to be reduced.

According to an exemplary embodiment of the present invention, a molar ratio of the reactants such as the terephthalate and alcohol is, for example, 1:0.005 to 5.0, 1:0.05 to 2.5, or 1:0.1 to 1.0, and therefore, in this range, a plasticizer composition having high process efficiency and an excellent effect of improving processability is obtained.

However, when the terephthalate-based material is a mixed material, a composition ratio is not limited within the above range, and its composition ratio may be altered by further adding any one of the three types of terephthalates in the mixed material. An available mixed composition ratio is the same as described above.

According to an exemplary embodiment of the present invention, the trans-esterification may be performed at a reaction temperature of 120 to 190° C., preferably 135 to 180° C., and more preferably 141 to 179° C. for 10 minutes to 10 hours, preferably 30 minutes to 8 hours, and more preferably 1 to 6 hours. In the above ranges of temperatures and time, a desired composition ratio of the terephthalate-based material, which is a mixture, may be effectively obtained. Here, the reaction time may be calculated from the time at which the reactants are heated and then reach the reaction temperature.

The trans-esterification may be performed in the presence of an acid catalyst or a metal catalyst, and thus there is an effect of reducing the reaction time.

The acid catalyst may be, for example, sulfuric acid, methanesulfonic acid, or p-toluenesulfonic acid, and the metal catalyst may be, for example, an organic metal catalyst, a metal oxide catalyst, a metal salt catalyst or a metal itself.

The metal component may be, for example, any one selected from the group consisting of tin, titanium and zirconium or a mixture of two or more thereof.

In addition, after the trans-esterification, distilling an unreacted alcohol and a reaction byproduct for removal may be further included.

The distillation may be, for example, two-step distillation for separating the alcohol from the reaction byproduct using a difference in boiling point.

In another example, the distillation may be mixed distillation. In this case, an ester-based plasticizer composition may be relatively and stably obtained at a desired composition ratio. The mixed distillation refers to simultaneous distillation of butanol and a reaction byproduct.

Alcohols used in the direct esterification and the transesterification may be a C1 to C12 alkyl alcohol, and 2 to 12 or 3 to 10 carbon atoms may be contained, and the alcohols are preferably butyl alcohol, isobutyl alcohol, 2-ethylhexyl alcohol or isononyl alcohol.

According to another exemplary embodiment of the present invention, 5 to 150 parts by weight, 40 to 100 parts by weight, or 40 to 50 parts by weight of the above-described plasticizer composition may be included with respect to 100 parts by weight of a resin, and therefore, a resin composition which is effective in all of compound formulation and/or sheet formulation may be provided.

The resin may be ethylene vinyl acetate, polyethylene, polyketone, polypropylene, polyvinyl chloride, polystyrene, polyurethane, a thermoplastic elastomer, or a mixture thereof.

According to an exemplary embodiment of the present invention, the resin composition may further comprise a filler.

The filler may be contained at 0 to 300 parts by weight, preferably 50 to 200 parts by weight, and more preferably 100 to 200 parts by weight on the basis of 100 parts by weight of the resin.

The filler may be a filler known in the art without particular limitation. For example, the filler may be a mixture of one or more selected from silica, magnesium carbonate, calcium carbonate, hard coal, talc, magnesium hydroxide, titanium dioxide, magnesium oxide, calcium hydroxide, aluminum hydroxide, aluminum silicate, magnesium silicate and barium sulfate.

In addition, the resin composition may further include other additives such as a stabilizer, etc. as needed.

The additives such as a stabilizer, etc. may be, for example, included at 0 to 20 parts by weight, and preferably 1 to 15 parts by weight on the basis of 100 parts by weight of the resin.

The stabilizer may be, for example, a calcium-zinc (Ca—Zn)-based stabilizer such as calcium-zinc combined stearate salt, but the present invention is not limited thereto.

The resin composition can be applied to various fields, as non-limited examples, such as in production of wires, flooring materials, interior materials for automobile, films, sheets, wallpaper or tubes.

The invention claimed is:

1. A plasticizer composition, comprising:
an ester-based material, which comprises an isophthalate-based material including a compound of Formula 1 below and a terephthalate-based material including a compound of Formula 2 below; and
an epoxidized oil,
wherein a weight ratio of the isophthalate-based material to the terephthalate-based material is 99:1 to 1:99:

[Formula 1]

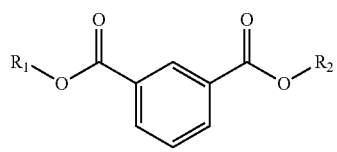

where each of $R_1$ and $R_2$ are the same or different, and each independently a C1 to C12 alkyl group; and

[Formula 2]

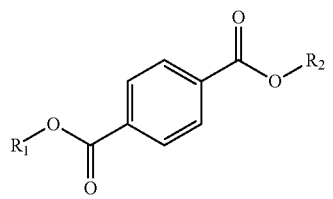

where $R_1$ and $R_2$ are the same or different, and each independently a C1 to C12 alkyl group, and
wherein the epoxidized oil is contained at 10 to 100 parts by weight with respect to 100 parts by weight of the ester-based material.

2. The plasticizer composition of claim 1, wherein $R_1$ of Formula 1 and $R_1$ of Formula 2 are the same, and $R_2$ of Formula 1 and $R_2$ of Formula 2 are the same.

3. The plasticizer composition of claim 1, wherein, in Formulas 1 and 2, $R_1$ and $R_2$ are each independently a C4 to C10 alkyl group.

4. The plasticizer composition of claim 1, wherein the isophthalate-based material is a mixed material comprising two or more compounds represented by Formula 1, and the mixed material comprises one or more compounds represented by Formula 1 in which $R_1$ and $R_2$ are different from each other.

5. The plasticizer composition of claim 1, wherein the terephthalate-based material is a mixed material comprising two or more compounds represented by Formula 2, and the mixed material comprises one or more compounds represented by Formula 2 in which $R_1$ and $R_2$ are different from each other.

6. The plasticizer composition of claim 1, wherein a weight ratio of the isophthalate-based material and the terephthalate-based material is 95:5 to 30:70.

7. The plasticizer composition of claim 1, wherein a weight ratio of the isophthalate-based material and the terephthalate-based material is 90:10 to 40:60.

8. The plasticizer composition of claim 1, wherein the epoxidized oil is contained at 20 to 100 parts by weight with respect to 100 parts by weight of the ester-based material.

9. The plasticizer composition of claim 1, wherein the epoxidized oil includes one or more oils selected from the group consisting of epoxidized soybean oil, epoxidized castor oil, epoxidized linseed oil, epoxidized palm oil, epoxidized stearate, epoxidized oleate, epoxidized tall oil and epoxidized linoleate.

10. A method of preparing a plasticizer composition, comprising:
preparing an ester-based material by mixing an isophthalate-based material with a terephthalate-based material at a weight ratio of 99:1 to 1:99; and
adding epoxidized oil to the ester-based material in an amount so that the epoxidized oil is present in an amount from 10 to 100 parts by weight with respect to 100 parts by weight of the ester-based material to obtain the plasticizer composition.

11. The method of claim 10, wherein the preparation of the ester-based material includes mixing products obtained in direct esterification between a mixture of isophthalic acid, terephthalic acid and a C2 to C12 alkyl alcohol; or
direct esterification between a C2 to C12 alkyl alcohol and either of isophthalic acid and terephthalic acid.

12. The method of claim 10, wherein
when the isophthalate-based material or the terephthalate-based material are a mixed material comprising two or more components, the mixed material is prepared by trans-esterification between the isophthalate-based material represented by Formula 1 below or the terephthalate-based material represented by Formula 2 below, and a C2 to C12 alkyl alcohol:

[Formula 1]

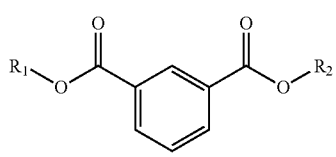

where $R_1$ and $R_2$ are the same or different, and each independently a C1 to C12 alkyl group; and

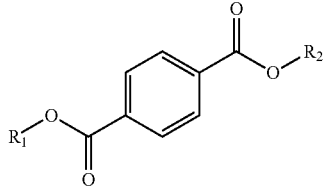

[Formula 2]

where $R_1$ and $R_2$ are the same or different, and each independently a C1 to C12 alkyl group.

13. A resin composition, comprising:
100 parts by weight of a resin; and
5 to 150 parts by weight of the plasticizer composition of claim 1.

14. The resin composition of claim 13, wherein the resin includes one or more selected from the group consisting of ethylene vinyl acetate, polyethylene, polypropylene, polyketone, polyvinyl chloride, polystyrene, polyurethane, and a thermoplastic elastomer.

* * * * *